2 Sheets--Sheet 1.

G. D. DUDLEY.
Holders for Vessels Containing Liquids, Perfumery, &c.

No. 147,751. Patented Feb. 24, 1874.

Witnesses.
E. H. Johnson
J. P. Crawford

Inventor.
Geo. D. Dudley
per L. A. Dunfrwatt

2 Sheets--Sheet 2.
G. D. DUDLEY.
Holders for Vessels Containing Liquids, Perfumery, &c.
No. 147,751. Patented Feb. 24, 1874.
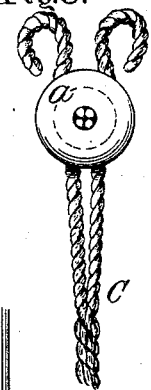
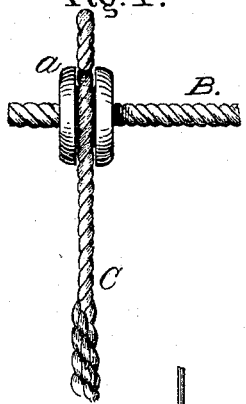
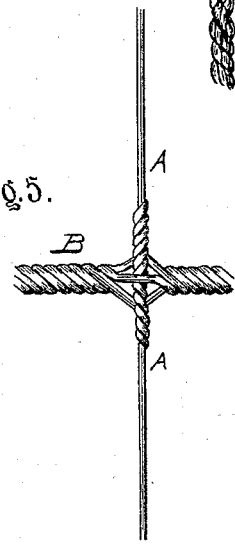
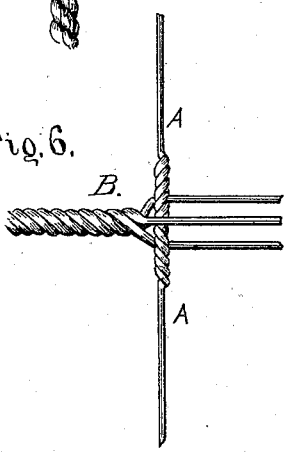
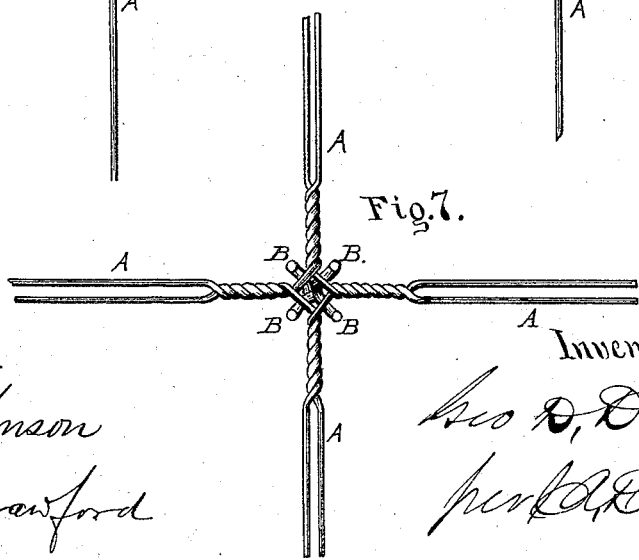
Witnesses.
E. N. Johnson
J. P. Crawford
Inventor.
Geo. D. Dudley

UNITED STATES PATENT OFFICE.

GEORGE D. DUDLEY, OF LOWELL, MASS., ASSIGNOR TO EDWARD P. WOODS, DANIEL SHERWOOD, AND CYRUS H. LATHAM, OF SAME PLACE.

IMPROVEMENT IN HOLDERS FOR VESSELS CONTAINING LIQUIDS, PERFUMERY, &c.

Specification forming part of Letters Patent No. 147,751, dated February 24, 1874; application filed June 24, 1873.

*To all whom it may concern:*

Be it known that I, GEORGE D. DUDLEY, of Lowell, in the county of Middlesex and State of Massachusetts, have invented an Improved Revolving Holder, of which the following is a specification:

My invention relates to holders for vessels containing liquids, perfumery, condiments, &c; and consists in a novel construction, combination, and arrangement of parts, which have for their object the production of a convenient, ornamental, and cheap article of manufacture for general use.

Figure 1:
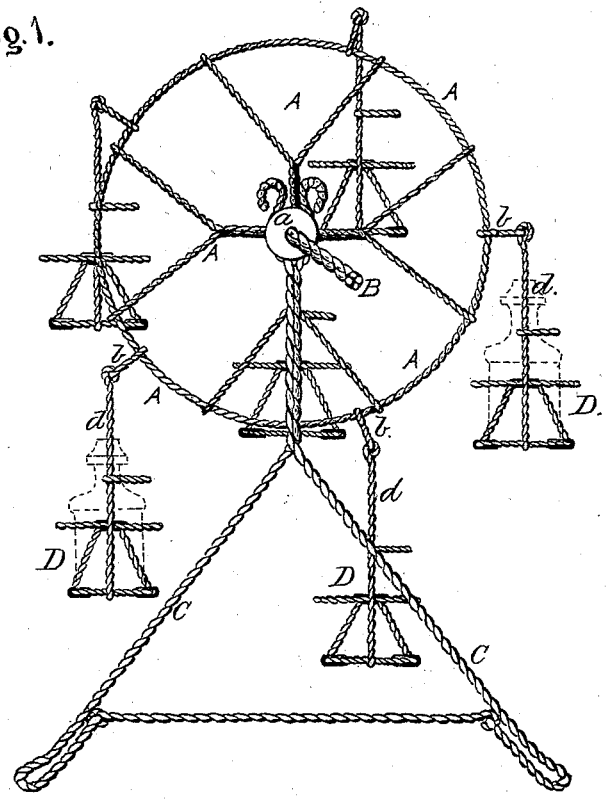
Figure 2:
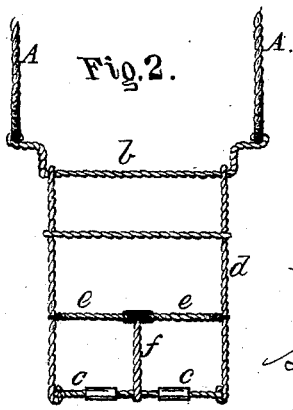

Figure 1 is a side elevation of my improved holder. Fig. 2 is an elevation of one of the hanging receivers.

The remaining figures are parts in detail, which will be explained hereafter.

A represents two rings or wheels, attached to the shaft or spindle B. On this shaft, outside of the rings A A, are two bearings or journals, *a a*, in which revolves the shaft B. The shaft and wheels are mounted on a frame or stand, C, the two uprights of which receive the journals *a a*. The extremities of the shaft are bent into crank-handles, by which the holder is revolved. The arms of the wheels A A are composed of strands of wires, which are twisted together from the center a short distance, separated, and then carried to the periphery, either parallel or diverging, where they are attached to the ring. The manner of securing the rings or wheels A A to the shaft B is shown in Figs. 5, 6, and 7, and is as follows: The shaft is composed of as many wires as there are arms to the wheel, which wires are twisted together to the desired width between the two wheels, and then separated at each extremity of the shaft, as shown in Figs. 6 and 7. The arms of the wheels A A are inserted between the wires, which are then twisted together to form the continuation of the shaft outside of the wheels, which are thus firmly secured to the shaft by being intertwisted with the wires constituting it, as shown in Fig. 5. Attached to the rings A A, parallel with the shaft B, are cross-pieces *b*, which serve to strengthen the rings, and at the same time afford supports for the receivers D, which depend from them. By reference to Fig. 2 the construction and offices of this cross-tie will be fully understood. The receivers D are constructed of wire, substantially as shown in Figs. 1 and 2 of the drawings, and from each end thereof rise perpendicularly the pieces *d d*, which are bent into hooks at their upper extremity, by which the receivers are hung to the cross-ties. Immediately over the rings *c c*, in the parallelogram, are larger rings, *e e*, which receive and hold the article, the lower rings *c c* serving as a support for it. To prevent the upper rings from being bent down where they meet, there is a strengthening-piece provided, as shown.

It will now be seen that, the receivers being above their center of gravity on the cross-ties, they will retain a perpendicular position at every point during the revolution of the wheel.

The bearings in which the shaft turns are composed of any suitable material, and have grooves cut in their periphery. (See Figs. 3 and 4.) The uprights of the stand supporting the revolving parts are each composed of strands of wire, forming the stand, which, after having been bent up into legs, are twisted together a few turns in a compound twist, when they are separated, carried up close together, and each bent into a semicircle of the diameter of the groove in the journal *a*, for which they form a box or retainer, into which the journal may easily be forced or withdrawn, the elasticity of the wires permitting them to be forced apart by the pressure of the journals.

From the foregoing, it will be readily understood that my caster is so constructed as to allow of its receiving a horizontal rotary motion, while the articles remain in a perpendicular position from their being suspended above their center of gravity to the revolving wheels. After the parts of the holder are completed they are immersed in a metallic bath, (generally of tin,) and coated with a metal that will not readily oxidize, which imparts to them a permanently bright appearance, and solders the parts together. The ends of the crank are bent up into crank-handles; but these may be dispensed with, and the holder rotated by the rings or receivers.

I do not limit or confine myself to any particular shape of supporting-frame, as that may be easily varied without involving invention.

In the above specification my claim for the wheel A is disclaimed, as that is the subject-matter of another application for Letters Patent filed by me June 27, 1873. I am aware of the Design Patent No. 784, for 1856, for a caster, and I disclaim such patent.

I claim—

1. The combination, with the supporting-brackets C C, of a revolving wire holder made up of wheel A and hooked pendent receivers D, constructed and operating substantially in the manner described.

2. The combination, with the spring-arms upon the brackets C, of the grooved detachable journals $a\ a$, constructed substantially in the manner described.

3. The holder D, constructed of wire, and combined with the revolving wheel, substantially in the manner described.

4. As a new and improved article of manufacture, the holder made up of the supporting-frame C, revolving wheel A, and pendent receivers D, constructed of wire, substantially in the manner described and specified.

GEORGE D. DUDLEY.

Witnesses:
ABEL WHITNEY,
I. A. WHITNEY.